G. W. OTTERSON.
APPARATUS FOR REMOVING SEDIMENT FROM CATCH BASINS OF SEWERS.
APPLICATION FILED FEB. 2, 1916.
1,327,211.
Patented Jan. 6, 1920.
2 SHEETS—SHEET 1.
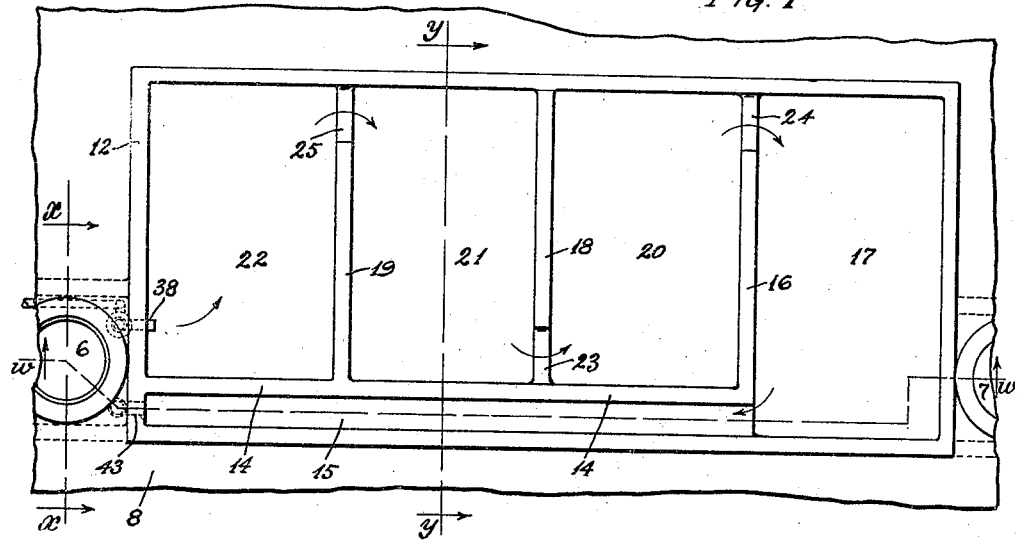
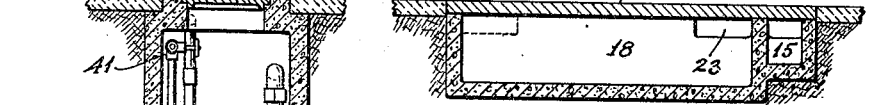
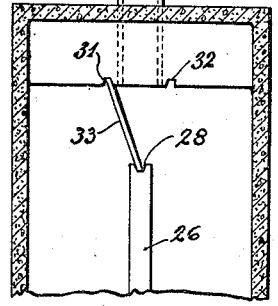
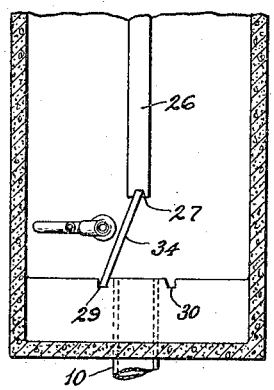
INVENTOR
George W. Otterson
BY
ATTORNEY

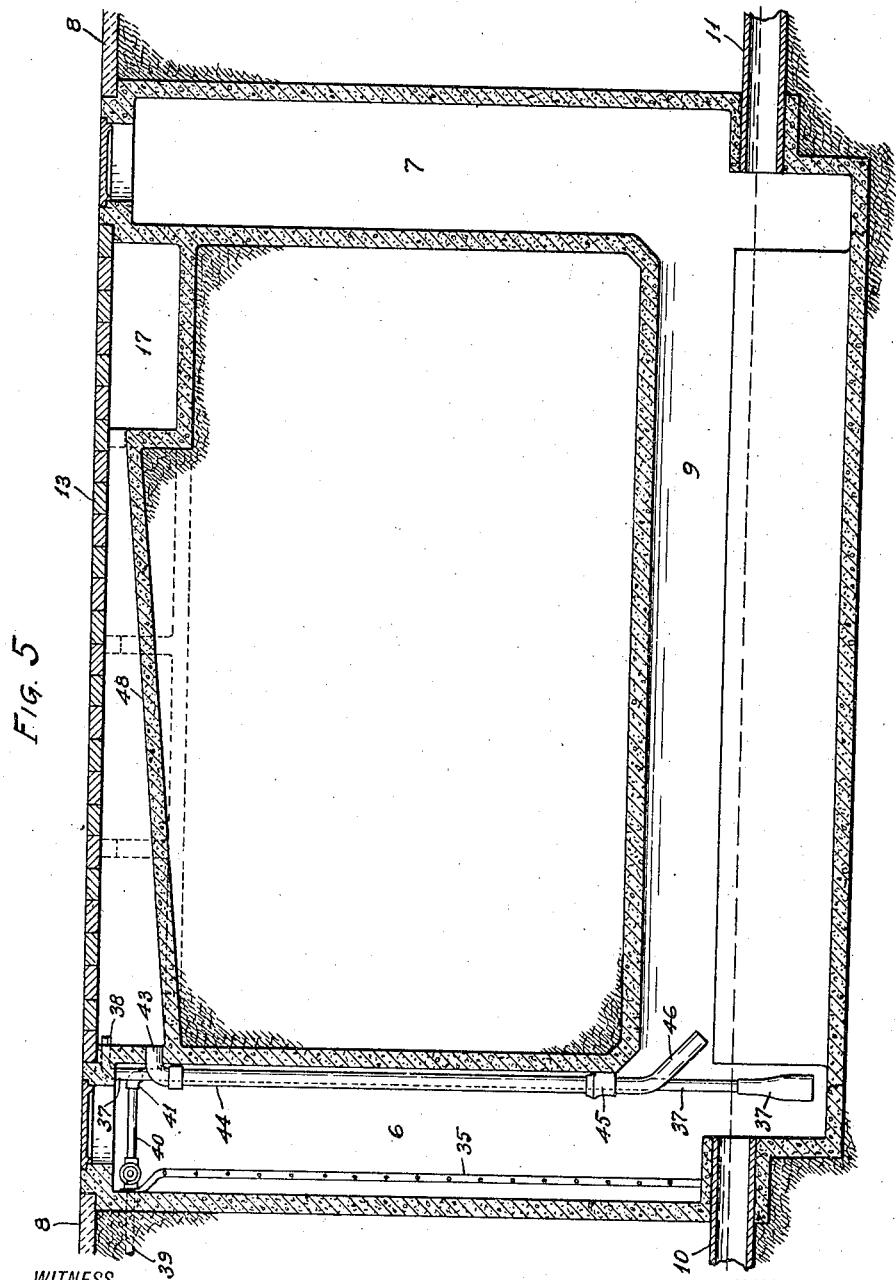

UNITED STATES PATENT OFFICE.

GEORGE W. OTTERSON, OF SEATTLE, WASHINGTON.

APPARATUS FOR REMOVING SEDIMENT FROM CATCH-BASINS OF SEWERS.

1,327,211.    Specification of Letters Patent.    Patented Jan. 6, 1920.

Application filed February 2, 1916. Serial No. 75,849.

*To all whom it may concern:*

Be it known that I, GEORGE W. OTTERSON, citizen of the United States, residing at Seattle, in the county of King and State of Washington, have invented a certain new and useful Improvement in Apparatus for Removing Sediment from Catch-Basins of Sewers, of which the following is a specification.
My invention relates to improvements in apparatus for removing sediment from catch-basins of sewers, and the object of my invention is to provide apparatus by which the force of water under pressure may be employed to agitate the sediment which has accumulated in a catch-basin of a sewer and then to carry such sediment upwardly into a settling receptacle that is accessible from the surface of a street, within which settling receptacle said sediment may be precipitated later to be removed therefrom, whereupon such water, now separated from the sediment may be conducted downwardly from said settling receptacle into said catch-basin.

I accomplish this object by devices illustrated in the accompanying drawings wherein Figure 1 is a plan view of a settling receptacle with its cover removed, showing such receptacle disposed in a street between two man holes that extend downwardly into the catch-basin of a sewer; Fig. 2 is a view in vertical section, on broken line *x, x* of Fig. 1, showing said man hole and a cross-section of a catch-basin; Fig. 3 is a view in cross-section on broken line *y, y*, of Fig. 1, showing said settling tank with its cover in position thereon, the top surface of said cover registering with the surface of the street; Fig. 4 is a view in horizontal section of a catch-basin on broken line *z, z* of Fig. 2; and Fig. 5 is a view in vertical section on broken line *w, w* of Fig. 1, showing the relative positions of the various devices associated to embody my invention.

Referring to the drawings, throughout which like reference numerals designate like parts, 6 and 7 designate man holes disposed to extend downwardly from the surface 8 of a street each into a different end portion of a catch-basin 9, each end of which catch-basin 9 is connected with a sewer pipe, as sewer pipes 10 and 11.

Disposed between the upper ends of the man holes 6 and 7 is a settling receptacle 12 which is provided with a removable cover 13 whose top surface is in the same plane with the top surface 8 of a street.

Preferably, the walls of said receptacle 12 are made integral of concrete, as are also the walls of the man holes 6 and 7 and the catch-basin 9.

The receptacle 12 is provided with a partition 14 disposed to extend from its end wall, adjacent to the man hole 6, toward its opposite end throughout three quarters of the length of said receptacle 12, said partition 14 being spaced from the side wall that is nearer said man holes 6 and 7, as shown more clearly in Fig. 1, whereby is formed a narrow passageway 15.

That end of the partition 14 which is nearer to the man hole 7 connects with the end of a partition 16 which extends therefrom directly across the receptacle 12 to the more distant side wall to form a settling compartment 17.

The floor 48 of the passageway 15 at its end adjacent to the junction of the partitions 14 and 16 is higher than the floor of the compartment 17 while its other end, adjacent to the man hole 6, is in the same plane with the floor of said compartment 17 whereby water only from the upper portion of said compartment may enter said passageway 15.

At equi-distant points between the partition 16 and the end wall adjacent to the man hole 6 are two transversely disposed partitions 18 and 19 which provide the receptacle 12 with three additional compartments 20, 21 and 22.

The partition 18, on that end portion of it adjacent to the partition 14, has a rectangular portion removed from its upper part to form a passageway 23 through which water may pass from the compartment 21 to the compartment 20 when the compartment 20 is more than three quarters full, and the partitions 16 and 19 are provided with similar passageways, as passageways 24 and 25 respectively, over their end portions adjacent to the opposite side wall of said receptacle 12 whereby when water is conducted into the compartment 22 such water, upon rising above three quarters of the height of the partition 19, will flow through the passageway 25 into the compartment 21, and when such water rises therein above three quarters of the height of the partition 18 it will flow through the passageway 23 into the compartment 20, and when such water rises therein above three quarters of the height of the partition 16 it will flow through the passageway 24 into the compartment 17, and when such water rises therein above the end of the floor of the passageway 15 then it will flow into the passageway 15, such course of said water being indicated by arrows in Fig. 1.

Extending upwardly from the central portion of the bottom of the catch-basin 9 to a line higher than the sewer pipes 10 and 11 is an integral partition 26 which extends longitudinally within said catch-basin 9 with its ends disposed at the same distance from the adjacent one of the sewer pipes 10 and 11, and each of the ends of said partitions 26 is provided with a vertically disposed groove, as grooves 27 and 28, and the end walls of the catch-basin 9 are each provided with two similar grooves (as grooves 29 and 30 and grooves 31 and 32) spaced from each other as more clearly shown in Fig. 4.

Within the grooves 28 and 31 is removably disposed a gate 33, and within the grooves 27 and 29 is removably disposed a similar gate 34, whereby water flowing between the sewer pipes 10 and 11 may pass only on one side of the partition 26.

The gate 33, may, however, be removed and inserted within the grooves 28 and 32 and the gate 34 may be removed and inserted in the grooves 27 and 30, whereby water flowing between the sewer pipes 10 and 11 would flow on the other side of said partition 26, thus, the catch-basin 9 may first be cleaned in that part of it on one side of said partition 26 and then be cleaned in that part on the other side of said partition 26.

Obviously, after the catch-basin 9 is cleaned on both sides of the partition 26 the gates 33 and 34 should be removed so that water of the sewer pipes 10 and 11 may flow on both sides of said partition 26.

Within the man hole 6, adjacent to the wall thereof, is a ladder 35 by which one may descend to the catch-basin 9.

Disposed within the catch-basin 9, at one end thereof, is a hydraulic elevator 36 whose delivery pipe 37 extends vertically upward adjacent to the vertical wall of the man hole 6, and the upper end of said delivery pipe 37 terminates in an angular portion 38 which leads into the upper portion of the compartment 22 whereby an operation of the hydraulic elevator 36 will act on the sediment and water contained in the catch-basin 9 to elevate such sediment in the form of muddy water and deliver it into the compartment 22.

Water under pressure for operating the hydraulic elevator 36 is conducted from a street water pipe 39 through a valve-controlled pipe 40 disposed in the upper portion of the man hole 6, which valve-controlled pipe 40 is connected by an elbow 41 with a pipe 42 that extends downwardly within the man hole 6 where its lower end is connected with the hydraulic elevator 36, whereby, in a well known manner, when water under pressure is admitted from the street water pipe 39 through the valve-controlled pipe 40 into said hydraulic elevator 36 through the pipe 42 then such hydraulic elevator 36 will be in operation to extract the sediment in the form of muddy water from the catch-basin 9 and deliver such sediment, in the form of muddy water, into said compartment 22.

Extending through the end wall of that end of the passageway 15 adjacent to the man hole 6, is an outlet pipe 43 which connects with an elbow that is connected to the top end of a pipe 44 which extends downwardly within the man hole 6 to a point near the bottom of said man hole 6 where its lower end is connected with a swivel joint 45 to the bottom end of which is connected an angular nozzle 46 which is thus rotatively movable to adapt it to be swung to deliver water (that may flow from the passageway 15) into that side of the catch-basin 9 that at the time is to be cleaned, the impact of such water serving to stir up the sediment deposited on such side of the catch-basin 9 to facilitate the operation of sucking such sediment into the hydraulic elevator 36.

When the muddy water containing the sediment from the catch-basin 9 flows into the compartment 22 such muddy water rises therein until it flows over the end portion of the partition 19 through the passageway 25 into the compartment 21 and such water in passing through the compartment 22 precipitates a large portion of its sediment within such compartment 22 and such water rising within the compartment 21 will flow over the end portion of the partition 18 through the passageway 23 into the compartment 20, and in passing through the compartment 21 it will precipitate much of its sediment therein, and such water rising within the compartment 20 will flow over the end portion of the partition 16 through the passageway 24 into the compartment 17 leaving another portion of its sediment within the compartment 20, then such water will rise in the compartment 17 to flow into the passageway 15 and during its flow through said compartment 17 practically all of the remainder of its sediment will have been precipitated within said compartment 17 so that such water upon entering the passageway 15 will contain little if any sediment, and then such clean water will flow through said passageway 15 into the outlet pipe 44, thence through the nozzle 46 into that side of the catch-basin 9 that is being operated upon.

After the catch-basin has been thoroughly cleaned and its sediment deposited in the several compartments of the receptacle 12 the head of water from the water pipe 39 is shut off by closing the valve in the valve-controlled pipe 40 and thereupon the gates 33 and 34 are removed and the covers of the man holes 6 and 7 may be replaced, after which at a convenient time the cover 13 of the receptacle 12 may be removed and the sediment deposited in the several compartments 17, 20, 21 and 22 may be shoveled into a dump wagon and carried away to a desired dumping ground, and after such sediment is thus removed from the receptacle 12, then, its cover 13 may be replaced to form a part of the surface of the street.

Obviously, changes may be made in the forms, dimensions and arrangement of parts of my invention without departing from the spirit thereof.

What I claim is:

1. The combination with a sewer containing a catch-basin, of a settling bed built in in connection with the sewer at or near the ground level, a hydraulic ejector elevator for removing deposits from the catch-basin upwardly to the settling bed, and a return for water from the settling bed to the sewer.

2. The combination with a sewer catch-basin, and a man-hole opening into the same, of a settling bed built in at or near the ground level adjacent the man-hole, a hydraulic ejector elevator extending within the man-hole for removing the contents of the catch-basin upward to the settling bed, and a return for water from the settling bed to the catch-basin.

3. The combination with a sewer containing a catch-basin, of a settling bed built in in connection with the sewer at or near the ground level, a hydraulic ejector elevator for removing deposits from the catch-basin upwardly to the settling bed, and means for returning water from the settling bed to the catch-basin and for utilizing the return stream to agitate the contents.

4. The combination with a sewer catch-basin having one or more man-holes, of a settling bed built in at or near the ground level, a hydraulic ejector elevator extending within a man-hole for removing deposits in the catch-basin upward to the settling bed, and a return line for water from the settling bed also extending within a man-hole and delivering its stream in such manner as to agitate the catch-basin contents.

5. The combination with a sewer catch-basin having an inlet and outlet, of means for changeably partitioning the catch-basin so as to cause the flow to pass through different parts at will, a settling bed built in at or near the ground level, a hydraulic ejector elevator for removing the contents of the catch-basin upward to the settling bed, the ejector being movable within the catch-basin, and a return line for water.

6. The combination with a sewer catch-basin having an inlet and outlet, of means for changeably partitioning the catch-basin so as to cause the flow to pass through different parts at will, a settling bed built in at or near the ground level, a hydraulic ejector elevator for removing the contents of the catch-basin upward to the settling bed, the ejector being movable within the catch-basin, and a return line for water movable to direct its stream to one side or other of the partition.

In witness whereof, I hereunto subscribe my name this 24th day of January, A. D., 1916.

GEORGE W. OTTERSON.

Witnesses:
 FRANK WARREN,
 O. JOHNSON.